US007809968B2

(12) United States Patent
Karstens

(10) Patent No.: US 7,809,968 B2
(45) Date of Patent: Oct. 5, 2010

(54) METHOD AND SYSTEM FOR MANAGING ECOSYSTEM SLEEP

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 11/775,920

(22) Filed: Jul. 11, 2007

(65) Prior Publication Data

US 2009/0019298 A1      Jan. 15, 2009

(51) Int. Cl.
*G06F 1/26* (2006.01)
(52) U.S. Cl. ........................ 713/323; 713/300
(58) Field of Classification Search ........... 713/300, 713/323
See application file for complete search history.

(56) References Cited

U.S. PATENT DOCUMENTS

| 7,016,710 | B2 | 3/2006 | Carmeli et al. |
| 7,058,828 | B2 | 6/2006 | Barr et al. |
| 2002/0178387 | A1 | 11/2002 | Theron |
| 2005/0198545 | A1 | 9/2005 | Wieck et al. |
| 2005/0283624 | A1 | 12/2005 | Kumar et al. |
| 2006/0161796 | A1 | 7/2006 | Cromer et al. |
| 2006/0168457 | A1 | 7/2006 | Leech et al. |
| 2006/0168462 | A1 | 7/2006 | Leech et al. |
| 2007/0047195 | A1 | 3/2007 | Merkin et al. |

*Primary Examiner*—Nitin C Patel
(74) *Attorney, Agent, or Firm*—Cantor Colburn LLP; Steven Bennett

(57) ABSTRACT

A method for managing sleep modes in an ecosystem of components, the method includes: receiving an inactivity signal from at least one component in the ecosystem of components, the inactivity signal indicating that a predefined period of inactivity has been exceeded for that component; sending a sleep command to one or more components in the ecosystem in response to the inactivity signal, thereby establishing a sleep mode in the one or more components; subsequent to establishing the sleep mode, detecting activity in one or more of the one or more components through an awake signal received therefrom; sending an awake message to the one or more components in response to the awake signal, thereby terminating the sleep mode in the one or more components; wherein the sleep mode shuts off defined non-essential features within the one or more components, while maintaining defined essential processing tasks associated with of the one or more components placed into the sleep mode.

20 Claims, 4 Drawing Sheets

METHOD AND SYSTEM FOR MANAGING ECOSYSTEM SLEEP

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to power management, and more particularly to a method and system for implementing sleep modes in a blade enclosure.

2. Description of the Related Art

A blade enclosure is an enclosure that contains two or more computer motherboards commonly referred to as "blades." Typically, each blade in a blade enclosure includes one or more processors, main memory, one or more network interfaces and optionally some secondary storage such as one or more disk drives. Within a given blade enclosure, each blade shares cooling and power infrastructure with the other blades in the enclosure. FIG. 1 illustrates a typical blade enclosure 100 with m blades 102, each of which may include a bus interface 104 and a network interface 106. The network interfaces of blades 102 may be connected to a network directly or indirectly, such as through an internal switch and/or router 108 as shown. Each of blades 102 may share certain enclosure resources such as power supply 110 and cooling system 112. An additional computing device, illustrated here as enclosure manager 114, provides administrative functionality necessary to manage the resources within the enclosure. Administrative software 116 runs on a processor of enclosure manager 114 for this purpose. Enclosure manager 114 is connected to each of blades 102 via an internal bus 118. Each of the blades 102 may have displays 120, which provide operating and status information and status.

Data communication continues to increase, especially with regard to the Internet where not only voice data but also high bandwidth video is being transmitted. The increasing data rates and volumes of information transmitted in communication systems and computer networks are driving demand for faster and more compact computer servers. Computer servers employ the blade architecture that was described in FIG. 1. The increased data rates require faster central processor units (CPUs) that operate at higher clock speeds. However, the higher clock speeds and data rate throughput of the CPUs create the problem of increased power consumption and production of heat. The acceleration of server consolidation in data centers has acerbated the problem. Server consolidation allows for more servers or blades to be placed on a rack in a data center, but server racks are running close to their theoretical limit due to the need to deliver large amounts of power into a small volume, and the large amount of heat created by the power consumption. The vast amounts of heat generated in a data center having several server racks require device thermal control and environmental cooling, which is an additional energy consumption concern. Thus, intelligent power management, at either the hardware layer or the software layer, is required to make more efficient use of energy resources. Intelligent power management allows more servers to be inserted into a rack, thus reducing space/management overhead. In addition, as energy costs keep rising, savings on utility bills become more important. Therefore, there is a need for continued advancements in power conservation management of blade components.

SUMMARY OF THE INVENTION

Embodiments of the present invention include a method and system for managing sleep modes in an ecosystem of components, the method includes: receiving an inactivity signal from at least one component in the ecosystem of components, the inactivity signal indicating that a predefined period of inactivity has been exceeded for that component; sending a sleep command to one or more components in the ecosystem in response to the inactivity signal, thereby establishing a sleep mode in the one or more components; subsequent to establishing the sleep mode, detecting activity in one or more of the one or more components through an awake signal received therefrom; sending an awake message to the one or more components in response to the awake signal, thereby terminating the sleep mode in the one or more components; wherein the sleep mode shuts off defined non-essential features within the one or more components, while maintaining defined essential processing tasks associated with of the one or more components placed into the sleep mode.

A system for managing sleep modes, the system includes: an ecosystem manager that receives an inactivity signal from at least one or more of the components indicating that a predefined period of inactivity has been exceeded for that component; wherein the ecosystem manager sends a sleep command to the one or more components in response to receiving the inactivity signal; wherein the one or more components enter a sleep mode in response to receiving the sleep command; wherein upon detection of activity in one or more components, the one or more components send an awake signal to the ecosystem manager; wherein in response to receiving the awake signal, the ecosystem manager sends an awake message to the one or more components so as to terminate the sleep; wherein the sleep mode shuts off defined non-essential features within one or more components, while maintaining defined essential processing tasks associated with of the one or more components placed into sleep mode.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, a solution is technically achieved for a method and system for managing ecosystem sleep modes in a blade enclosure.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
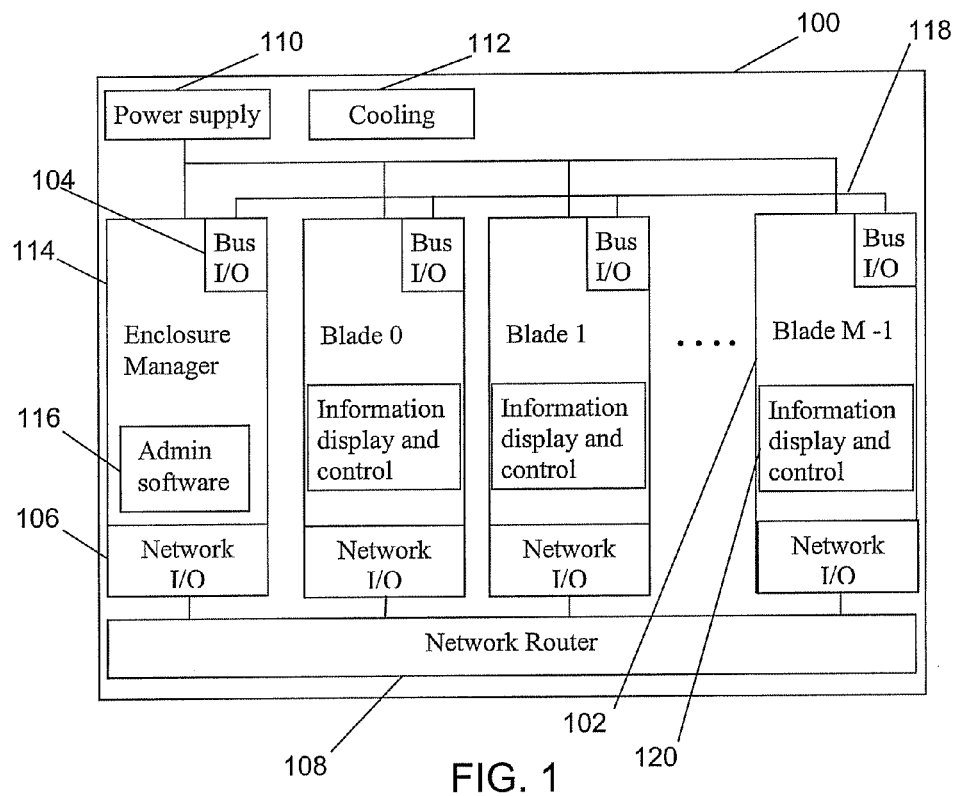
FIG. 1 is a block diagram illustrating a typical blade enclosure.

The detailed description explains the preferred embodiments of the invention, together with advantages and features, by way of example with reference to the drawings.

DETAILED DESCRIPTION

Embodiments of the invention provide a method and system for managing sleep modes in an electronic computing ecosystem. As used herein, the term "electronic computing ecosystem" (or "ecosystem" for short) refers to a system of computing components (e.g., processors, main memory, one or more network interfaces, networking switches, secondary storage devices) located within a given (blade) enclosure, wherein each blade shares cooling, networking, and power infrastructure with the other blades in the enclosure. Sleep refers to lowering the operating levels of any electronic equipment within the enclosure when they are not being accessed, and shutting off defined non-essential features. Essential processing tasks may remain enabled during sleep mode, including, for example, microprocessors, memory, input-output devices, network connections, network switch operations, etc. In a further example, communication processes in a data site or cellular telephone repeater may continue, while human interfaces and displays may be shut off during sleep mode. Sleep modes are utilized to conserve energy, and to reduce operating temperatures of an ecosystem, as well as to extend the operating lives of components and displays. Certain display technologies such as electro luminescent, plasma, and light emitting diodes have limited service lives that can be extended by dimming them or turning them off when not in use. An ecosystem has individual components that may enter into sleep modes, as well as the entire ecosystem entering into a sleep mode. Devices that enter into a sleep mode can be awakened either through user interaction with the devices controls, or through remote electronic signals.

In an embodiment of the invention implemented in a blade enclosure or component rack that forms the ecosystem, each individual blade or component has a sleep timeout interval, wherein a sleep mode is entered into based on a predefined period of non-use or interaction with the individual blade or component. When a blade or component times out (exceeds the predefined period of inactivity), the individual blade or component sends a "timeout" message to an ecosystem management tool or enclosure manager. The ecosystem manager may enable the sleep function only after all target blades or components have timed out, or alternatively one blade or component at a time may be allowed to enter into a sleep mode. Therefore, the ecosystem management tool can be configured for either ecosystem sleep with all blades or components entering into a sleep mode at the same time, or for individual blades or components to enter into a sleep mode on their own schedules. In both of these scenarios, the ecosystem management tool sends the sleep command or message to the target blades or components.

The blades or components that have entered into a sleep mode are awakened when an operator interacts with one of the blades or components. Awakening a sleeping blade or component restores the defined non-essential features of the blade or component to full operational levels. The operator interaction can be physical, such as touching a control interface, or electronically initiated by remote signals. When awakened, the individual blade or component sends an "awake" message to the ecosystem management tool. In response to receiving the "awake" message, the ecosystem management tool sends an "awake" message to the target blades and components in a particular ecosystem, or a set of ecosystems or racks. Upon receiving the "awake" message the target blades and components wake up from their sleep modes and restore themselves to a full functionality.

Figure 2A:
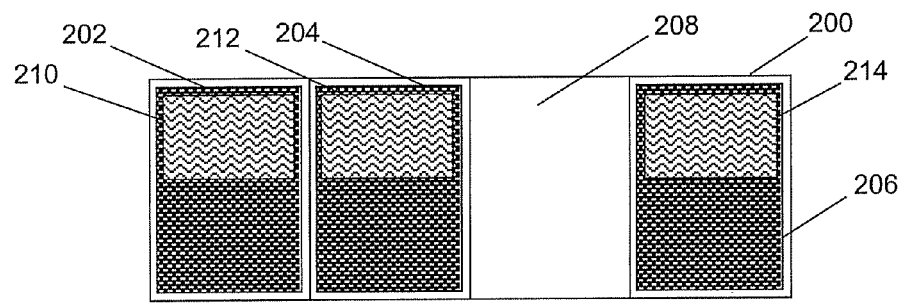
FIGS. 2A-2G illustrates sleep mode in a series of blades with a screen saver scroll according to an embodiment of the invention.
Figure 2B:
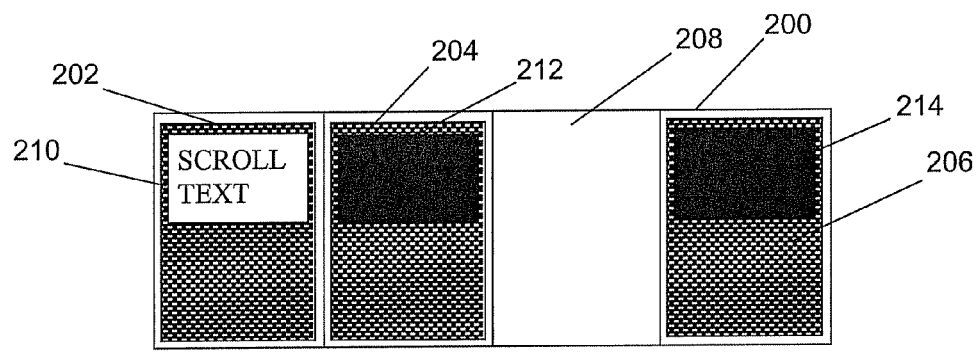
Figure 2C:
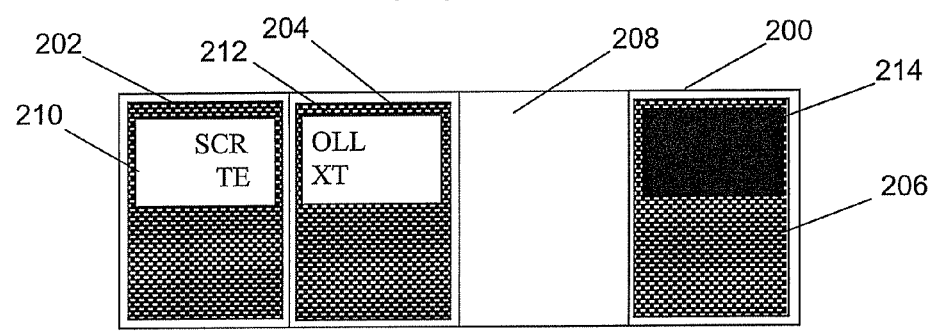
Figure 2D:
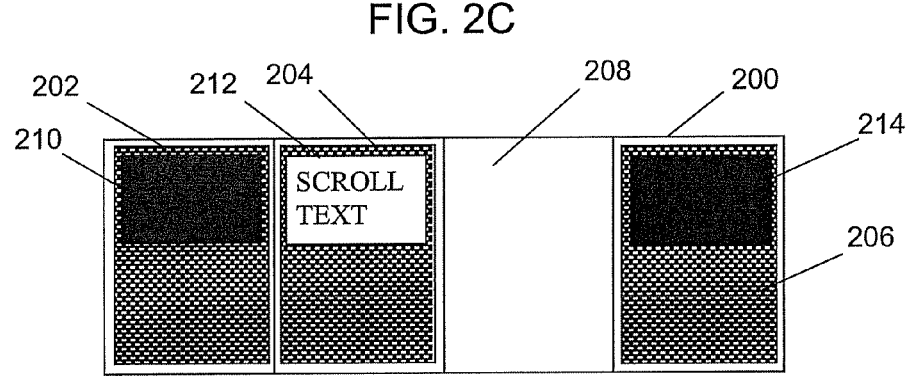
Figure 2E:
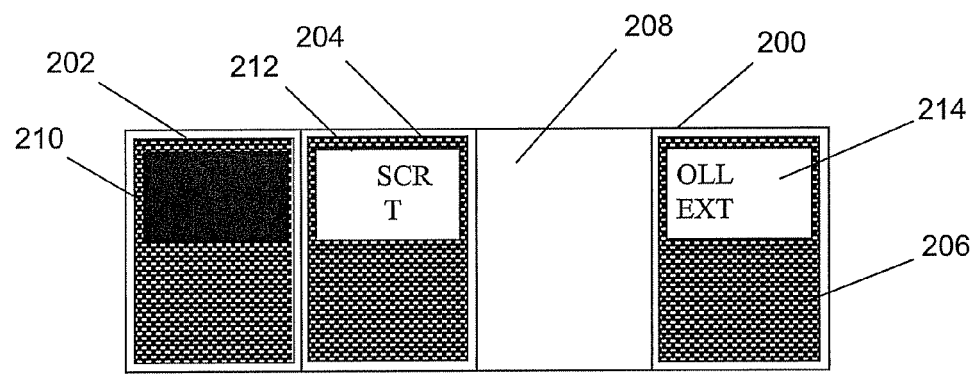
Figure 2F:
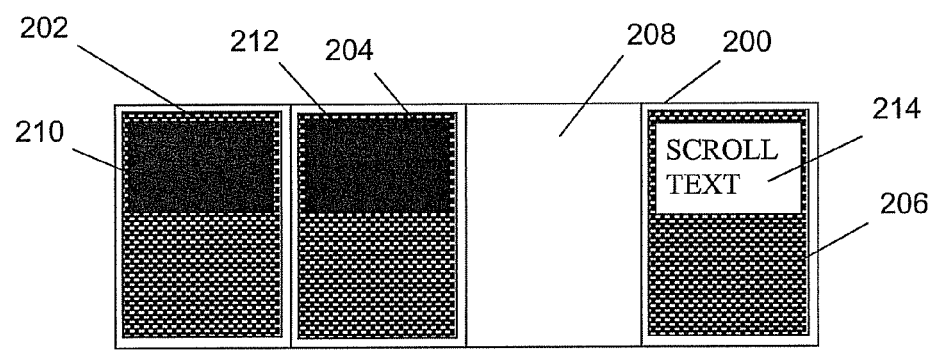
Figure 2G:
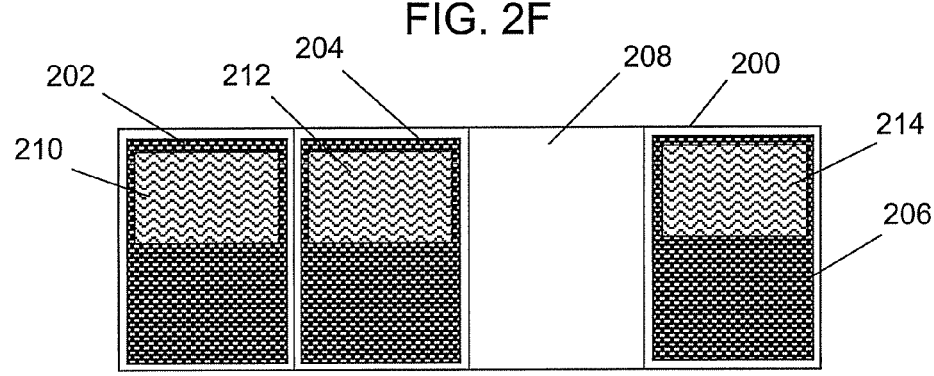

FIGS. 2A-2G illustrate an embodiment of the invention where the displays of a series of blades in a blade enclosure 200 are put into a sleep mode with a scrolling text message, scrolling image, or both that indicates that the blade displays are in sleep mode. In FIGS. 2A-2G blades 202, 204, and 206 occupy slots in the blade enclosure, with slot 208 empty. In FIG. 2A at time $T_0$, the displays (210, 212, 214) on blades (202, 204, 206), respectively are all on. In FIG. 2B at time $T_1$, a timeout occurs in at least one of the blades (202, 204, 206), and a signal is sent to the ecosystem management tool (not shown, but equivalent to the enclosure manager 114 of FIG. 1) by at least one of the blades (202, 204, 206) that a timeout has occurred. In response, the ecosystem management tool places the blades (202, 204, 206) into a sleep mode, and initiates a scrolling message or image indicative of the sleep mode. In FIG. 2B screen display 210 has the scrolling text, and screen displays 212 and 214 are turned off. In FIG. 2C at time $T_2$ the scroll text progresses from screen 210 to 212, and screen 214 remains off. In FIG. 2D at time $T_3$, only screen 212 is on, with displays 210 and 214 off. In FIG. 2E at time $T_4$, both displays 212 and 214 share the scroll text, and screen 210 remains off. In FIG. 2F at time $T_5$, both displays 210 and 212 are off and screen 214 displays the scroll text. The scrolling text continues in this manner until the system is awakened from the sleep mode. It should be noted that the scroll may randomly proceed in any direction, and in a non-repeating pattern. In addition, depending on the display technology, the screen saver implemented by the ecosystem manager may also cycle through colors to extend the service life of the displays. During the display cycling of FIGS. 2A-2G, the essential functions of the blades carry on. At a future time $T_N$ an operator will awaken the ecosystem by touching one of the touch screen displays (210, 212, 214) of blade (202, 204, 206) for example, and the displays (210, 212, 214) of blades (202, 204, 206) will turn on via a signal from the ecosystem manager as shown in FIG. 2G.

Figure 3:
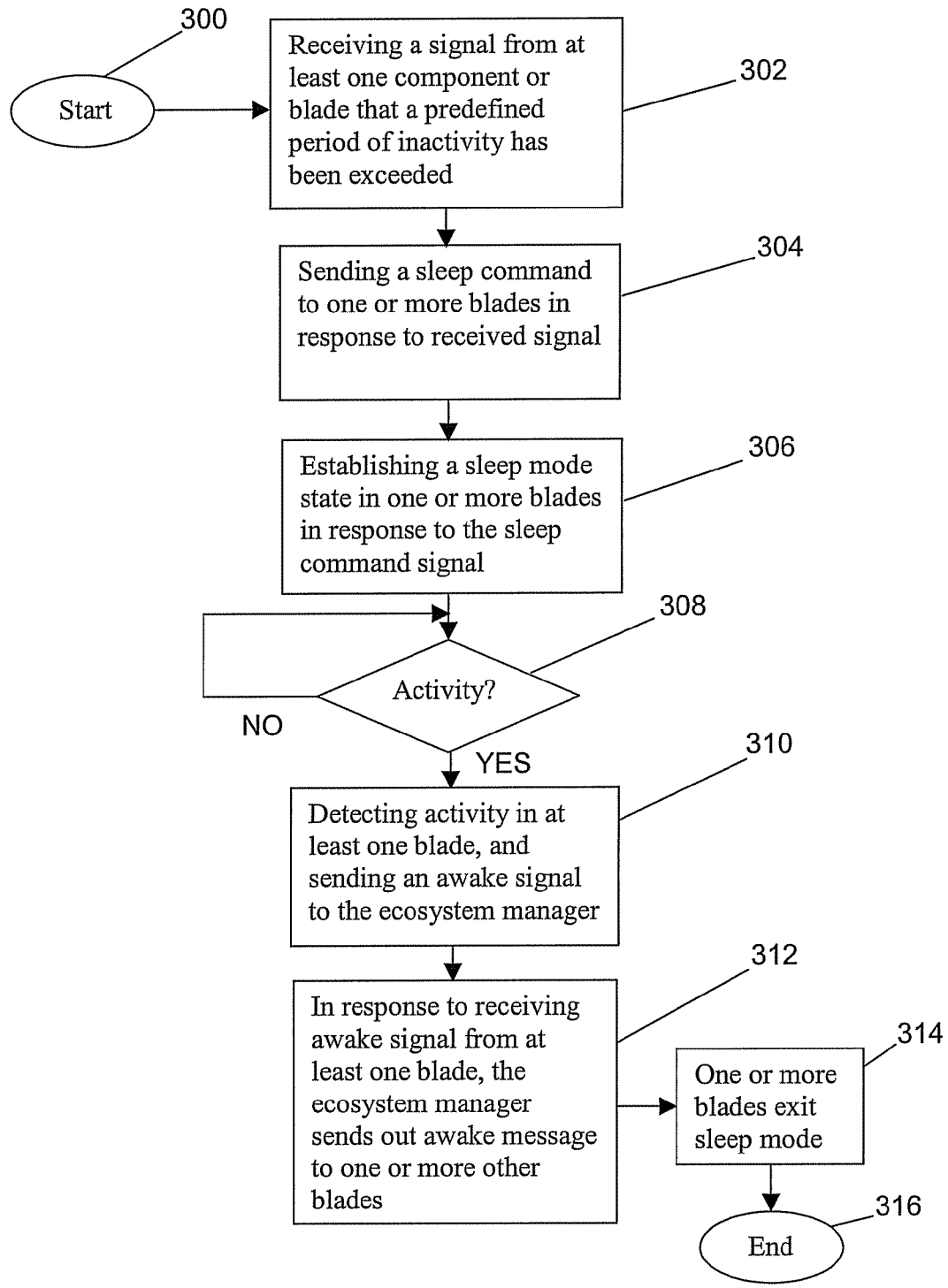
FIG. 3 is a flow diagram that outlines a method for managing sleep modes in an ecosystem according to an embodiment of the invention.

FIG. 3 is a flow diagram that outlines a method for managing sleep modes in an ecosystem according to an embodiment of the invention. The method starts (block 300) upon receiving a signal from at least one component or blade that a predefined period of inactivity has been exceeded (block 302), the ecosystem manager sends a sleep command to one or more components or blades (block 304). In response, to the sleep command, the one or more components or blades enter into a sleep mode (block 306). The one or more components or blades remain in sleep mode until activity is detected (block 308) by at least one of the components or blades. When activity is detected (decision block 308 is YES) in at least one component or blade, the component or blade sends an awake signal to the ecosystem manager (block 308). In response to receiving the awake signal from at least one component or blade, the ecosystem manager sends out an awake message to one or more other components or blades (block 312), and the components or blades exit their sleep modes 314 and the method ends (block 316).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for managing sleep modes in an electronic computing ecosystem of components, the method comprising:
   receiving an inactivity signal from at least one component in the ecosystem of components, the inactivity signal indicating that a predefined period of inactivity has been exceeded for that component;
   sending a sleep command to one or more components in the ecosystem in response to the inactivity signal, thereby establishing a sleep mode in the one or more components;
   subsequent to establishing the sleep mode, detecting activity in one or more of the one or more components through an awake signal received therefrom;
   sending an awake message to the one or more components in response to the awake signal, thereby terminating the sleep mode in the one or more components;
   wherein the sleep mode shuts off defined non-essential features within the one or more components, while maintaining defined essential processing tasks associated with of the one or more components placed into the sleep mode.

2. The method of claim 1, wherein the ecosystem has individual components that enter into sleep mode based on inactivity.

3. The method of claim 1, wherein the ecosystem has all components enter into sleep mode based on inactivity in at least one component.

4. The method of claim 1, wherein the detected activity is based on operator interaction involving a physical activity.

5. The method of claim 1, wherein the detected activity is based on operator interaction electronically initiated by remote signals.

6. The method of claim 1, wherein the one or more components are blades with individual displays, wherein during sleep mode the displays are turned off.

7. The method of claim 1, wherein the one or more components are blades with individual displays, wherein during sleep mode the displays are turned on and off in a progressive manner.

8. The method of claim 1, wherein the one or more components are blades with individual displays, wherein during sleep mode the displays have scrolling text indicating the displays are in sleep mode.

9. The method of claim 1, wherein the one or more components are blades with individual displays, wherein during sleep mode the displays have a scrolling image indicating the displays are in sleep mode.

10. The method of claim 1, wherein the one or more components are blades with individual displays, wherein during sleep mode the displays are turned off; and wherein when one of the blades awaken all of displays turn on.

11. A system for managing sleep modes of an electronic computing ecosystem of components included within an enclosure, the system comprising:
    an ecosystem manager that receives an inactivity signal from at least one or more of the components indicating that a predefined period of inactivity has been exceeded for that component;
    wherein the ecosystem manager sends a sleep command to the one or more components in response to receiving the inactivity signal;
    wherein the one or more components enter a sleep mode in response to receiving the sleep command;
    wherein upon detection of activity in one or more components, the one or more components send an awake signal to the ecosystem manager;
    wherein in response to receiving the awake signal, the ecosystem manager sends an awake message to the one or more components so as to terminate the sleep;
    wherein the sleep mode shuts off defined non-essential features within one or more components, while maintaining defined essential processing tasks associated with of the one or more components placed into sleep mode.

12. The system of claim 11, wherein the one or more components enter into sleep mode on an individual basis based on inactivity.

13. The system of claim 11, wherein the ecosystem has all components enter into sleep mode based on inactivity in at least one component.

14. The system of claim 11, wherein the detected activity is based on operator interaction involving a physical activity.

15. The system of claim 11, wherein the detected activity is based on operator interaction electronically initiated by remote signals.

16. The system of claim 11, wherein the one or more components are blades with individual displays, wherein during sleep mode the displays are turned off.

17. The system of claim 11, wherein the one or more components are blades with individual displays, wherein during sleep mode the displays are turned on and off in a progressive manner.

18. The system of claim 11, wherein the one or more components are blades with individual displays, wherein during sleep mode the displays have scrolling text indicating the displays are in sleep mode.

19. The system of claim 11, wherein the one or more components are blades with individual displays, wherein during sleep mode the displays have a scrolling image indicating the displays are in sleep mode.

20. The system of claim 11, wherein the one or more components are blades with individual displays, wherein during sleep mode the displays are turned off, and
    wherein when one of the blades awaken all of displays turn on.

* * * * *